Dec. 13, 1927.
W. BRÜCKEL
1,652,974
PROTECTIVE SYSTEM
Filed April 22, 1925
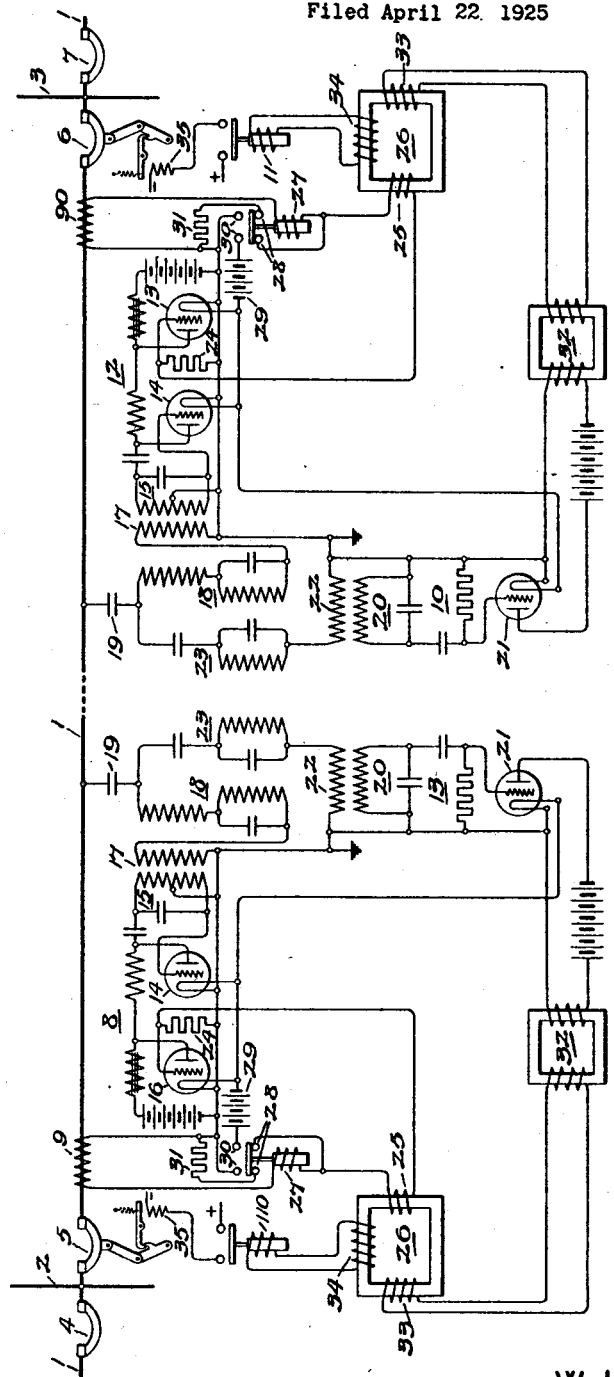
Inventor:
Waldemar Brückel,
by
His Attorney.

Patented Dec. 13, 1927.

1,652,974

UNITED STATES PATENT OFFICE.

WALDEMAR BRÜCKEL, OF BERLIN, GERMANY, ASSIGNOR TO GENERAL ELECTRIC COMPANY, A CORPORATION OF NEW YORK.

PROTECTIVE SYSTEM.

Application filed April 22, 1925, Serial No. 25,004, and in Germany May 30, 1924.

My invention relates to improvements in protective systems for electric circuits and more particularly to improvements in protective systems for alternating current circuits wherein discriminating action is obtained by comparison of electric characteristics of a circuit at different points thereof and an object of my invention is to provide an improved discriminating protective system wherein the use of pilot wires is eliminated.

My invention will be better understood from the following description taken in connection with the accompanying drawing and its scope will be pointed out in the appended claims.

The single figure of the accompanying drawing illustrates in a single line diagram for the sake of clearness an embodiment of my invention as applied to two points of an alternating current circuit such as a power line conductor 1 which may extend between a plurality of interconnected generating and distributing stations, two of which are illustrated as busses 2, 3. Three sections of the line 1 are shown, extending two from and one between the stations 2 and 3, the latter section being shown partly by a broken line to give a concept of distance between the stations. For controlling the circuits of the different sections at the ends thereof suitable circuit interrupting means, such as circuit breakers 4 and 5 on opposite sides of the bus at station 2 and circuit breakers 6 and 7 on opposite sides of the bus at station 3 may be provided so that, on the occurrence of a fault on any section such as the one between the stations 2 and 3, the section can be isolated without interrupting continuity of service on the sound sections. Although my invention is herein illustrated as applied to a sectionalized circuit such as a power line feeder or the like, since it has a particular phase of utility where distance between stations is involved, its application is not so limited as it is also adapted to the discriminating protection of parallel lines and the like.

In accordance with my invention, I provide means, such as thermionic apparatus 8 at one point of the circuit, for transmitting a carrier wave of a predetermined frequency and for modulating the carrier wave in accordance with an electric characteristic of the circuit at the point. This characteristic of the circuit may be, for example, the current in the circuit or a current proportional thereto, which may be obtained from the output of suitable transforming means such as a current transformer 9. The carrier wave may be transmitted through space without wires or as a carrier current over the line conductor 1 from the transmitter 8 to means, such as a thermionic receiver 10 located at another point of the circuit for demodulating the modulated carrier wave transmitted by the transmitter 8. For controlling the circuit breaker 6 selectively in accordance with the demodulated carrier wave and an electric characteristic of the circuit at the location of the receiver 10, I provide means such as a relay 11 which, as shown, is arranged to be actuated when the currents in the circuit at the ends of the section between the stations 2 and 3 exceed a definite difference in phase and/or magnitude, that is, in accordance with the resultant of the demodulated carrier current and the current in the circuit at station 3 or a current proportional thereto as provided by a current transformer 90.

In a similar manner, the station 3 is provided with a transmitter 12 adapted to transmit a carrier wave having a frequency differing from that transmitted by the transmitter 8 and modulated in accordance with the current in the circuit at station 3, that is by the potential across the secondary of the current transformer 90. Also station 2 is provided with a receiver 13 adapted to demodulate the carrier wave transmitted by the transmitter 12. For controlling the circuit breaker 5, a relay 110, arranged to be actuated in accordance with the resultant of this demodulated carrier wave and the current in the secondary of the current transformer 9 is provided. Similar apparatus may be provided for each circuit breaker in the conductor 1 at every station so that upon the occurrence of a fault in any section, the circuit breakers controlling that section are opened and the section thus isolated.

The transmitters 8 and 12 may be of any suitable type and are herein shown as high frequency devices of a type well known to the art. They comprise an oscillator element including an oscillator thermionic device or tube 14 and an oscillator circuit 15, the oscillations of which are modulated by a modulator element, including a modulator thermionic device or tube 16. The oscillator circuit 15 is coupled to the conductor 1 through an output or coupling coil 17 and the high frequency modulated oscillation or carrier wave is transmitted in a manner well known to the art over a suitably tuned stop circuit or wave trap 18 and a condenser 19 to the conductor 1. The receivers 10 and 13 may be of any suitable type and are herein shown as high frequency devices of a type well known to the art. They comprise a receiving circuit 20 and a rectifier or demodulator thermionic device or tube 21, the output of which may be suitably amplified as is well known to the art. The receiving circuit 20 is coupled to the conductor 1 through an input or coupling coil 22 which is energized by the modulated carrier current transmitted over the condensers 19 and a suitably tuned stop circuit or wave trap 23. The stop circuits 18 and 23 at the respective stations prevent interference between the transmitter and receiver at the station by blocking the high frequency oscillations of the transmitter at the station from the receiver at the same station, while permitting the passage of the high frequency oscillations from the transmitter 8 or 12 at one station to the receiver 10 or 13 respectively at the other station. The receivers 10 and 13 are tuned to the frequencies of the carrier waves transmitted by the transmitters 8 and 12 respectively and in view of inherent variations in line conditions, such as length of section, impedance and like factors, the different circuit elements of the transmitters and receivers may be made adjustable to secure the desired tuning.

For modulating the carrier wave of the oscillator circuit in accordance with the output of the secondary of the current transformer at the station, the circuit of the secondary is provided with suitable means, such as a resistance 24 which is also included in the grid circuit of the modulator tube 16. Consequently, the potential on the grid will vary in accordance with the current in the circuit 1 at the station. The secondary circuit also includes a winding 25 of differentially responsive means comprising a transformer 26.

In order that the transmitter and receiver at a station may be normally inactive, the secondary circuit may also include suitable electroresponsive means, such as an overcurrent relay 27 arranged normally to complete a shunt circuit across the secondary of the current transformer through contacts 28 and upon the occurrence of a predetermined current in the circuit 1 to open the shunt circuit and close the circuit of the filament source 29 through contacts 30. The shunt circuit preferably includes a resistance 31 proportioned in accordance with the resistance of the winding 25 and the resistance 24 in order to prevent unstable operation of the relay 27 when the predetermined current occurs, that is, so that when the predetermined current occurs, the relay 27 will pick up and stay up while the current remains at such predetermined value.

The output or modulated carrier wave of the transmitter at one station as rectified or demodulated and amplified, if desired, by the receiver at the adjacent station, and the current at the adjacent station are correlated by the transformer 26. The demodulated carrier current may first be transformed by an intermediate transformer 32 having a winding in the plate or output circuit of the receiver and a winding in circuit with a winding 33 on the transformer 26 arranged differentially with respect to the winding 25. The purpose of the transformer 32 is to obtain better balance between the impedance of the receiver output circuit and the load circuit which includes the winding 33, that is, to match the tube impedance with the load impedance.

The windings 25 and 33 of the transformer 26 are arranged for opposing magnetomotive forces so long as the currents at the stations are substantially in phase and therefore a secondary winding 34 normally has no electromotive force induced therein unless the current at one station exceeds that at the other or differs in phase therefrom. The secondary winding 34 has in circuit therewith the winding of the relay 11 or 110 which is arranged to control the circuit breaker at the station through its trip coil 35.

Assuming normal line conditions, then if the overcurrent relays 27 are used, neither of the transmitters 8 or 12 nor the receivers 10 or 13 will be operating. Upon the occurrence of an abnormal circuit condition causing a predetermined current at the stations, the relays 27 will operate and thus effect the operation of the transmitters and receivers. If the abnormal circuit condition is due to a through fault, that is, a fault outside of the section of the circuit 1 between the stations 2 and 3, then the windings 25 and 33 will be energized substantially alike and therefore produce no current to cause the operation of the relays 11 and 110. If, however, the fault is within the section and assuming that the system of which the circuit 1 is a part is such that the fault may be fed from each end, that is, from stations 2 and 3, then the windings 25 and 33 assist, since the currents at the stations now differ in phase and may also differ in magnitude. The resultant magnetomotive force of these windings now induces sufficient electromotive force in the windings 34 of the transformers 26 to effect operation of the relays 11 and 110. In place of the differential transformers 26, and relays 11 and 110, it is apparent that suitable differential relays may be employed.

Those skilled in the art will appreciate that my invention is susceptible to numerous modifications, and accordingly it is not desired that it be limited to the particular arrangement and apparatus herein described. It is therefore, aimed in the appended claims to cover all modifications which are within the spirit and scope of my invention.

What I claim as new and desire to secure by Letters Patent of the United States, is:—

1. A protective system for an electric circuit comprising means at one point of the circuit for transmitting a carrier wave of a predetermined frequency and for modulating the carrier wave in accordance with an electric characteristic of the circuit at said point, means at another point of the circuit for demodulating said carrier wave, and circuit controlling means arranged to be controlled by said demodulated carrier wave and an electric characteristic of the circuit at said other point.

2. A protective system for an electric circuit comprising means at one point of the circuit for transmitting a carrier wave of a predetermined frequency and for modulating the carrier wave in accordance with an electric characteristic of the circuit at said point, means at another point of the circuit for demodulating said carrier wave, and means for controlling the circuit in accordance with the resultant of the demodulated carrier wave and the electric characteristic of the circuit at said other point corresponding to the electric characteristic in accordance with which the carrier wave is modulated.

3. A protective system for an electric circuit comprising means at one point of the circuit for transmitting a carrier wave of a predetermined frequency and for modulating the carrier wave in accordance with the intensity of the current in the circuit at said point, receiving means at another point of the circuit adapted to demodulate said carrier wave, and means for controlling the circuit in accordance with the resultant of the demodulated wave and the intensity of the current in the circuit at said other point.

4. A protective system for an alternating current circuit comprising transforming means associated with the circuit at separate points thereof, transmitting means at one of said points adapted to transmit a carrier wave modulated in accordance with the output of the transforming means at said point, receiving means at another of said points adapted to demodulate said carrier wave, and means for controlling the circuit at said other point in accordance with the resultant of the demodulated wave and the output of the transforming means at said other point.

5. In a protective system of the type wherein circuit controlling means are controlled in accordance with the difference between the currents at the ends of a section of an electric circuit, means for controlling the circuit controlling means at one end of the section comprising a device responsive to the current in the circuit at that end of the section and means for affecting said device in accordance with the current in the circuit at the other end of the section comprising means for transmitting between the ends of the section a carrier wave modulated in accordance with the current in the circuit at the other end of the section.

6. In a protective system of the type wherein circuit controlling means are controlled in accordance with the difference between the currents at the ends of a section of an electric circuit, means for controlling the circuit controlling means at one end of the section comprising a transformer having a winding connected to be energized in accordance with the current at that end of the section and a cooperating winding arranged to be energized in accordance with the current at the other end of the section, and means for effecting the energization of said cooperating winding in accordance with the current at the other end of the section comprising means for transmitting from said other end a carrier wave modulated in accordance with the current in the circuit at that end.

7. In a protective system of the type wherein circuit controlling means at each end of a section of an electric circuit are controlled in accordance with the difference between the currents at the ends of the section, means at each end of the section for controlling the circuit controlling means at the respective end comprising a transformer having a winding connected to be energized in accordance with the current in the circuit at the end of the section at which the transformer is located and a cooperating winding, means for transmitting a carrier wave modulated in accordance with the current in the section at the respective end, the transmitting means at the two ends being arranged to transmit carrier waves having different predetermined frequencies, and receiving means for effecting the energization of the cooperating winding of the transformer at one end of the section in accordance with the modulated carrier wave transmitted from the other end of the section.

8. In a protective system of the type wherein circuit controlling means at each end of a section of an electric circuit are controlled in accordance with the difference between the currents at the ends of the section, means at each end of the section for controlling the circuit controlling means at the respective end comprising a transformer having a winding connected to be energized in accordance with the current in the circuit at the end of the section at which the transformer is located and a cooperating winding, means for transmitting a carrier wave modulated in accordance with the current in the section at the respective end, the transmitting means at the two ends being arranged to transmit carrier waves having different predetermined frequencies, receiving means for effecting the energization of the cooperating winding of the transformer at one end of the section in accordance with the modulated carrier wave transmitted from the other end of the section, and means at each end of the section for preventing interference between the transmitting and receiving means at the respective end and for permitting passage of the modulated carrier wave transmitted from one end to the receiving means at the other end.

9. A protective system for an alternating current circuit comprising transforming means associated with the circuit at separate points thereof, transmitting means at one of said points adapted to transmit a carrier wave modulated in accordance with the output of the transforming means at said point, receiving means at another of said points adapted to demodulate said carrier wave, and means for correlating the demodulated wave and the output of the transforming means at said other point comprising electroresponsive circuit controlling means arranged to be controlled in accordance with the resultant of the demodulated wave and the output of the transforming means at said other point.

10. A protective system for an electric circuit comprising normally inactive means at one point of the circuit for transmitting a carrier wave of a predetermined frequency and for modulating the carrier wave in accordance with an electric characteristic of the circuit at said point, means for effecting operation of said normally inactive means on the occurence of an abnormal circuit condition, means at another point of the circuit for demodulating said carrier wave, and circuit controlling means arranged to be controlled by said demodulated carrier wave and an electric characteristic of the circuit at said other point.

11. A protective system for an electric circuit comprising normally inactive means at one point of the circuit for transmitting a carrier wave of a predetermined frequency and for modulating the carrier wave in accordance with an electric characteristic of the circuit at said point, normally inactive means at another point of the circuit for demodulating said carrier wave, means for effecting operation of both of said normally inactive means on the occurrence of a fault on the circuit, and circuit controlling means arranged to be controlled by said demodulated carrier wave and an electric characteristic of the circuit at said other point.

12. A protective system for an alternating current circuit comprising current transformers associated with the circuit at separate points thereof, normally inactive transmitting means at one of said points adapted to transmit a carrier current modulated in accordance with the potential across the secondary of the current transformer at said point, normally inactive receiving means at another of said points adapted to demodulate said carrier current, means for effecting the operation of said transmitting and receiving means on the occurrence of an abnormal circuit condition, and means for controlling the circuit at said other point in accordance with the resultant of the demodulated carrier current and the output of the secondary of the current transformer at said other point.

13. A protective system for an alternating current circuit comprising current transformers associated with the circuit at separate points thereof, normally inactive transmitting means at one of said points adapted to transmit a carrier current having a predetermined frequency and modulated in accordance with the potential across the secondary of the current transformer at said point, normally inactive receiving means at another of said points adapted to demodulate said carrier current, over-current relays at said points respectively arranged to effect operation of the transmitting and the receiving means upon the occurrence of a predetermined current in the circuit and means for controlling the circuit at said other point in accordance with the difference between the demodulated carrier current and the output of the secondary of the current transformer at said other point.

14. A protective system for an alternating current circuit comprising current transformers associated with the circuit at separate points thereof, transmitting means at one of said points adapted to transmit a carrier current modulated in accordance with the potential across the secondary of the current transformer at said point, receiving means at another of said points adapted to demodulate said carrier current, and means for controlling the circuit at said other point in accordance with the resultant of the demodulated carrier current and the output of the secondary of the current transformer at said other point.

15. A protective system for an alternating current circuit comprising current transformers associated with the circuit at separate points thereof, transmitting means at one of said points adapted to transmit a carrier current having a predetermined frequency and modulated in accordance with the potential across the secondary of the current transformer at said point, receiving means at another of said points adapted to demodulate said carrier current, and means for correlating the demodulated carrier current and the output of the secondary of the current transformer at said other point comprising electroresponsive circuit controlling means arranged to be controlled in accordance with the resultant of the demodulated carrier current and the output of the secondary of the current transformer at said other point.

16. A differential protective system for an alternating current circuit comprising current transformers associated with the circuit at separate points thereof and means for controlling the circuit in accordance with the difference between the currents in the circuit at said points comprising a normally inactive transmitter at one of said points adapted to transmit a carrier current having a predetermined frequency and modulated in accordance with the output of the secondary of the current transformer at said point, a normally inactive receiver at another of said points adapted to demodulate said carrier current, an over-current relay at each of said points respectively arranged to effect operation of the transmitter and receiver upon the occurrence of a predetermined current in the circuit at said points, and a relay arranged to be controlled in accordance with the difference between said demodulated carrier current and the output of the secondary of the current transformer at said other point.

In witness whereof, I have hereunto set my hand this 4th day of April, 1925.

WALDEMAR BRÜCKEL.